United States Patent
Naka et al.

(10) Patent No.: US 9,538,451 B2
(45) Date of Patent: Jan. 3, 2017

(54) WIRELESS COMMUNICATION DEVICE, WIRELESS COMMUNICATION METHOD, AND COMPUTER-READABLE RECORDING MEDIUM STORING PROGRAM

(71) Applicant: Panasonic Corporation, Osaka (JP)

(72) Inventors: Ken Naka, Tokyo (JP); Yoshio Urabe, Nara (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 14/625,617

(22) Filed: Feb. 18, 2015

(65) Prior Publication Data

US 2015/0245275 A1    Aug. 27, 2015

(30) Foreign Application Priority Data

Feb. 25, 2014  (JP) ................................. 2014-034527

(51) Int. Cl.
| | | |
|---|---|---|
| *H04L 12/28* | (2006.01) | |
| *H04W 40/24* | (2009.01) | |
| *H04W 8/00* | (2009.01) | |
| H04W 88/06 | (2009.01) | |
| H04W 84/12 | (2009.01) | |

(52) U.S. Cl.
CPC ........... *H04W 40/244* (2013.01); *H04W 8/005* (2013.01); *H04W 84/12* (2013.01); *H04W 88/06* (2013.01)

(58) Field of Classification Search
CPC .... H04W 40/244; H04W 8/005; H04W 84/12; H04W 88/06
See application file for complete search history.

(56) References Cited

U.S. PATENT DOCUMENTS

| | | | |
|---|---|---|---|
| 2006/0039563 A1 | 2/2006 | Carter et al. | |
| 2013/0034023 A1* | 2/2013 | Jung ...................... | H04L 67/104 370/255 |
| 2013/0223341 A1* | 8/2013 | Kim ...................... | H04W 4/005 370/328 |

(Continued)

OTHER PUBLICATIONS

IEEE Computer Society "Part11:Wireless LAN Medium Access Control(MAC)and Physical Layer(PHY) Specifications Amendment3:Enhancements for Very High Throughput in the 60 GHz Band" IEEE Std 802.11ad,Dec. 28, 2012.

*Primary Examiner* — Clemence Han
(74) *Attorney, Agent, or Firm* — Seed IP Law Group LLP

(57) ABSTRACT

A wireless communication device includes a communication unit that performs communication, a finding unit that finds another wireless communication device by using a first frame, a phase determining unit that determines whether the wireless communication device is in a first phase or in a second phase when information concerning the other wireless communication device is obtained that is found, a communication mode setting unit that sets a communication mode for sending or receiving a second frame and an action frame in accordance with a determination result, and a group forming unit that sends or receives the second frame and the action frame in accordance with the set communication mode. The second frame includes schedule information concerning a bandwidth used for communication with the other wireless communication device, and the action frame is used for forming a group with the other wireless communication device.

16 Claims, 11 Drawing Sheets

(56) References Cited

U.S. PATENT DOCUMENTS

| | | | |
|---|---|---|---|
| 2013/0336161 A1* | 12/2013 | Jung | H04W 76/023 370/254 |
| 2014/0233549 A1* | 8/2014 | Kim | H04W 72/082 370/338 |
| 2015/0110090 A1* | 4/2015 | Ding | H04W 4/08 370/338 |
| 2015/0373777 A1* | 12/2015 | Sakai | H04W 8/005 370/328 |

* cited by examiner

FIG. 8A

| Frame Control | Duration | BBSID | Body | FCS |

FIG. 8B

| Order | Information |
|---|---|
| 1 | Timestamp |
| 2 | Sector Sweep |
| 3 | Beacon Interval |
| 4 | Beacon Interval Control |
| 5 | DMG Parameters |
| 6 | Clustering Control |
| 7 | DMG Capabilities |
| 8 | Extended Schedule |
| 9 | RSN |
| 10 | Multiple BSSID |
| 11 | DMG Operation |
| 12 | Next DMG ATI |
| 13 | DMG BSS Parameter Change |
| 14 | Multi-band |
| Last-n | One or more elements can appear in this frame. These elements follow all other elements that are not vendor-specific elements and precede all other elements that are vendor-specific elements that are part of the Last field in the frame. Except for the Multi-band element, an element can be included only once in the frame. |
| Last | Vendor Specific |

FIG. 8C

| BSS Type | CBAP Only | CBAP Source | DMG Privacy | ECPAC Policy Enforced | Reserved |

FIG. 8D

| Element ID | Length | Allocation 1 | Allocation 2 | ... | Allocation n |

FIG. 8E

| Allocation Control | BF Control | Source AID | Destination AID | Allocation Start | Allocation Block Duration | Number of Blocks | Allocation Block Period |

FIG. 8F

| B0 | B1 | B2 B5 | B6 | B7 | B8 B10 B13 | B14 |
|---|---|---|---|---|---|---|
| CC Present | Discovery Mode | Next Beacon | ATI Present | A-BFT Length | FSS | Isresponder TXSS |

Bits: 1 | 1 | 4 | 1 | 3 | 4 | 1

| B15 B18 | B19 | B20 B26 B27 | B30 B31 | B36 B37 | B42 | B43 | B44 | B47 |
|---|---|---|---|---|---|---|---|---|
| Next A-BFT | Fragmented TXSS | TXSS Span | N BIs A-BFT | A-BFT Count | N A-BFT in Ant | PCP Associnban Ready | Reserved | |

Bits: 4 | 1 | 7 | 4 | 6 | 6 | 1 | 1 | 4

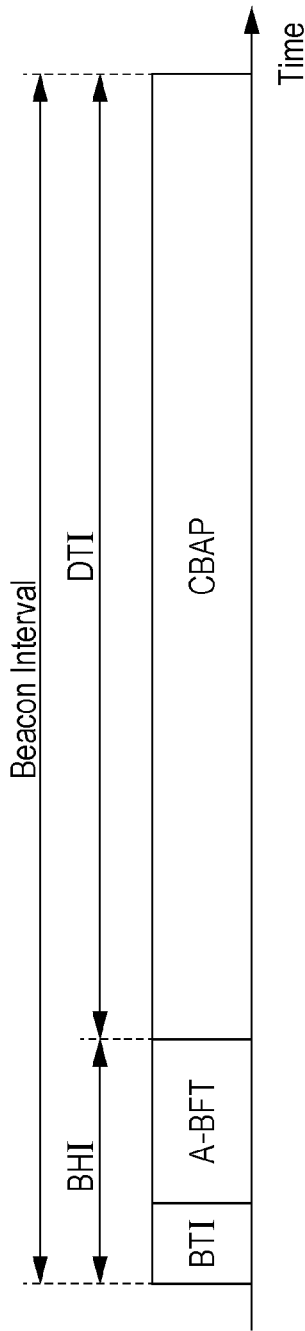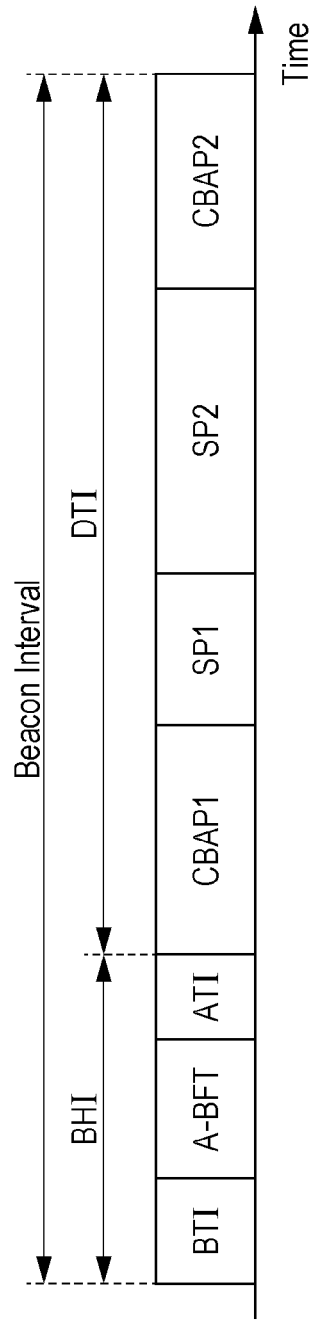

FIG. 10A

| Frame Control | Duration | Address1 | Address2 | Address3 | Sequence Control | HT Control | Frame Body | FCS |
|---|---|---|---|---|---|---|---|---|

←——————————————— MAC Header ———————————————→

FIG. 10B

| Order | Information |
|---|---|
| 1 | Action |
| Last | One or more vendor-specific elements may appear in this frame. This element follows all other elements. |

FIG. 10C

| Order | Information |
|---|---|
| 1 | Category |
| 2 | Unprotected DMG Action |
| 3 | Timestamp |
| 4 | Beacon Interval |
| 5 | SSID(optional) |
| 6 | Extended Schedule(optional) |
| 7 | DMG Capabilities(optional) |
| 8 | RSN(optional) |
| 9 | Multiple BSSID(optional) |
| 10 | DMG Operation(optional) |
| 11 | Next DMG ATI(optional) |
| 12 | Multi-band(optional) |
| Last-n | Multiple elements can appear in this frame. These elements follow all other elements that are not vendor-specific elements and precede all other elements that are vendor-specific elements. |
| Last | Vendor Specific(optional) |

WIRELESS COMMUNICATION DEVICE, WIRELESS COMMUNICATION METHOD, AND COMPUTER-READABLE RECORDING MEDIUM STORING PROGRAM

BACKGROUND

1. Technical Field

The present disclosure relates to a wireless communication device, a wireless communication method, and a non-transitory computer-readable recoding medium storing program.

2. Description of the Related Art

Hitherto, in communication using Wi-Fi (hereinafter referred to as "Wi-Fi communication"), Wi-Fi Direct (also called Wi-Fi P2P), which is a protocol that enables two wireless communication devices to directly communicate with each other without requiring an access point, is known. Wi-Fi Direct enables communication between two wireless communication devices, for example, by the following procedure (see, for example, U.S. Pat. No. 8,036,639).

In Wi-Fi Direct, two wireless communication devices find each other by sending and receiving beacons (find phase). Then, the two wireless communication devices decide roles, that is, a group owner (also called "GO") and a client (also called "CL"). Then, the two wireless communication devices exchange information for forming a group and execute Wi-Fi Protected Setup (WPS) so as to share an authentication key (group formation procedure (phase)). Then, one of the wireless communication devices which serves as a GO and the other wireless communication device which serves as a CL execute Wi-Fi Protected Access (WPA) and the CL participates in a group formed by the GO (operational phase). According to this procedure, data communication can be performed between the wireless communication device serving as the GO and the wireless communication device serving as the CL.

As a communication system other than Wi-Fi communication, wireless communication using Wireless Gigabit (Wi-Gig), which is a wireless communication standard protocol, or using IEEE802.11ad (hereinafter such communication will be referred to as "WiGig communication") is known (see, for example, IEEE Std 802. 11ad-2012). By using a millimeter 60 GHz band, in WiGig communication, a greater amount of data can be sent and received more speedily than in Wi-Fi communication.

SUMMARY

When wireless communication devices directly communicate with each other by the application of WiFi-Direct technologies to a communication system which requires bandwidth management (for example, WiGig communication), a communication channel between the wireless communication devices may not be correctly established. Accordingly, a sufficient level of the quality of direct communication by using a communication system which requires bandwidth management may not be obtained.

Thus, a non-limiting and exemplary embodiment of the present disclosure provides a wireless communication device, a wireless communication method, and a non-transitory computer-readable recording medium storing a program that implement an improvement in the communication quality when wireless communication devices directly communicate with each other by using a predetermined communication system.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a wireless communication device including: a communication unit that performs communication a finding unit that finds another wireless communication device via the communication unit by using a first frame; a phase determining unit that determines whether the wireless communication device is in a first phase in which the first frame is sent or in a second phase in which the first frame is received when information concerning the other wireless communication device that is founded is obtained; a communication mode setting unit that sets a communication mode for sending or receiving a second frame and an action frame in accordance with a result determined by the phase determining unit, the second frame including schedule information concerning a bandwidth used for communication with the other wireless communication device, the action frame being used for forming a group with the other wireless communication device; and a group forming unit that sends or receives the second frame and the action frame via the communication unit in accordance with a communication mode set by the communication mode setting unit.

These general and specific aspects may be implemented using a device, a system, a method, and a computer program, and any combination of devices, systems, methods, and computer programs.

According to an aspect of the present disclosure, it is possible to improve the communication quality when wireless communication devices directly communicate with each other by using a predetermined communication system.

BRIEF DESCRIPTION OF THE DRAWINGS

FIGS. 8A through 8F illustrate examples of the configurations of a beacon according to an embodiment;

FIGS. 9A and 9B illustrate an example of the configuration of Beacon Interval according to an embodiment;

FIGS. 10A through 10C illustrate examples of the configurations of an announce frame according to an embodiment.

DETAILED DESCRIPTION

Figure 1:
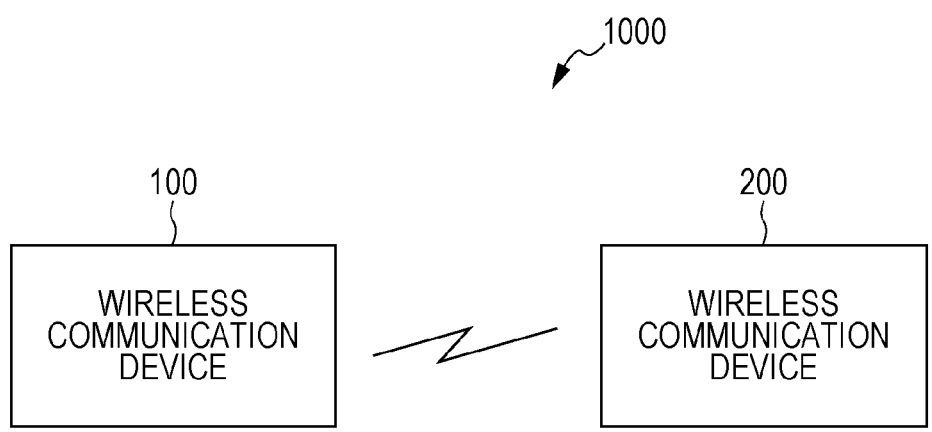
FIG. 1 is a block diagram illustrating an example of the configuration of a wireless communication system according to an embodiment.

An embodiment of the present disclosure will be described below with reference to the accompanying drawings.

(Underlying Knowledge Forming Basis of Aspect the Present Disclosure)

It is assumed that the technologies of Wi-Fi Direct are applied to WiGig communication. Hereinafter, direct communication between wireless communication devices in WiGig communication will also be referred to as "WiGig P2P".

According to IEEE Std 802. 11ad-2012, in WiGi communication, except for special frames (such as beacon frames and probe frames), frames are sent and received according to schedules within a beacon interval, and also, the schedules are supplied in the form of schedule information included in a beacon frame or an announce frame.

Accordingly, in WiGig P2P, at least one of two wireless communication devices which will communicate with each other sends a beacon including schedule information so as to manage the bandwidth. Unless the bandwidth of WiGig P2P is managed, a wireless communication device is unable to send an action frame, which serves as a trigger for forming a group.

In contrast, in Wi-Fi Direct, neither of two wireless communication devices which will communicate with each other sends schedule information during a period from when the find phase is completed until when the group formation phase is completed.

Accordingly, when Wi-Fi Direct is applied to WiGig communication, during a period from when the find phase is completed until when the group formation phase is completed, a wireless communication device is unable to manage the bandwidth in WiGig P2P and is accordingly unable to send an action frame. In this case, two wireless communication devices can execute none of group formation, WPS, and WPA, and thus, a communication channel between the two wireless communication devices is not correctly established, thereby failing to perform data communication. Thus, the communication quality of WiGig P2P is not sufficiently high.

Not only WiGig communication, but also another communication system that performs communication according to schedules, that is, a communication system that requires bandwidth management, encounters a similar situation.

In the following embodiment, a description will be given of a wireless communication device, a wireless communication method, and a recording medium storing a wireless communication program that implement an improvement in the communication quality when wireless communication devices directly communicate with each other by using a predetermined communication system.

Examples of wireless communication devices in the following embodiment are smartphones, tablets, personal computers, Blu-ray disc recorders, television sets, game machines, music players, dongles, access points, routers, and other wireless commination devices. A dongle is a device that is attachable to and detachable from a predetermined device via various interfaces, such as a universal serial bus (USB), a high-definition multimedia interface (HDMI) (registered), and a mobile high-definition link (MHL).

(Embodiment)

FIG. 1 is a block diagram illustrating an example of the configuration of a wireless communication system 1000 according to an embodiment. The wireless communication system 1000 includes wireless communication devices 100 and 200. The wireless communication devices 100 and 200 are connected to each other via a wireless network. The number of wireless communication devices in the wireless communication system 1000 is not restricted to two, and may be three or more.

The wireless communication devices 100 and 200 of the wireless communication system 1000 communicate with each other by using a communication system, for example, WiGig 2P2. The communication system used by the wireless communication devices 100 and 200 is not restricted to WiGig P2P. The wireless communication devices 100 and 200 may communicate with each other by switching between WiGig 2P2 and another communication system, for example, WiGig communication using an access point, Wi-Fi Direct, or Wi-Fi communication using an access point.

Figure 2:
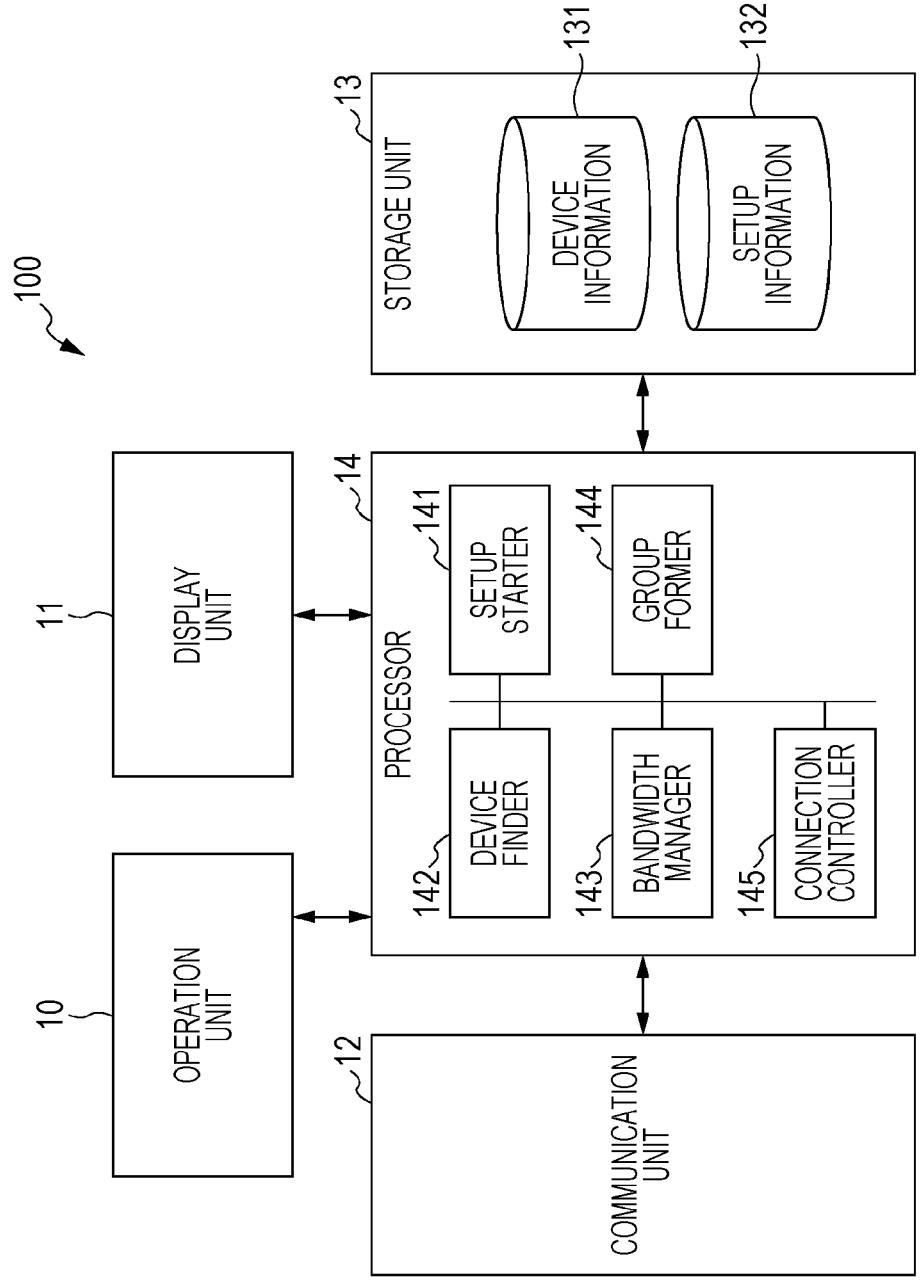
FIG. 2 is a block diagram illustrating an example of the configuration of a wireless communication device according to an embodiment.
Figure 3:
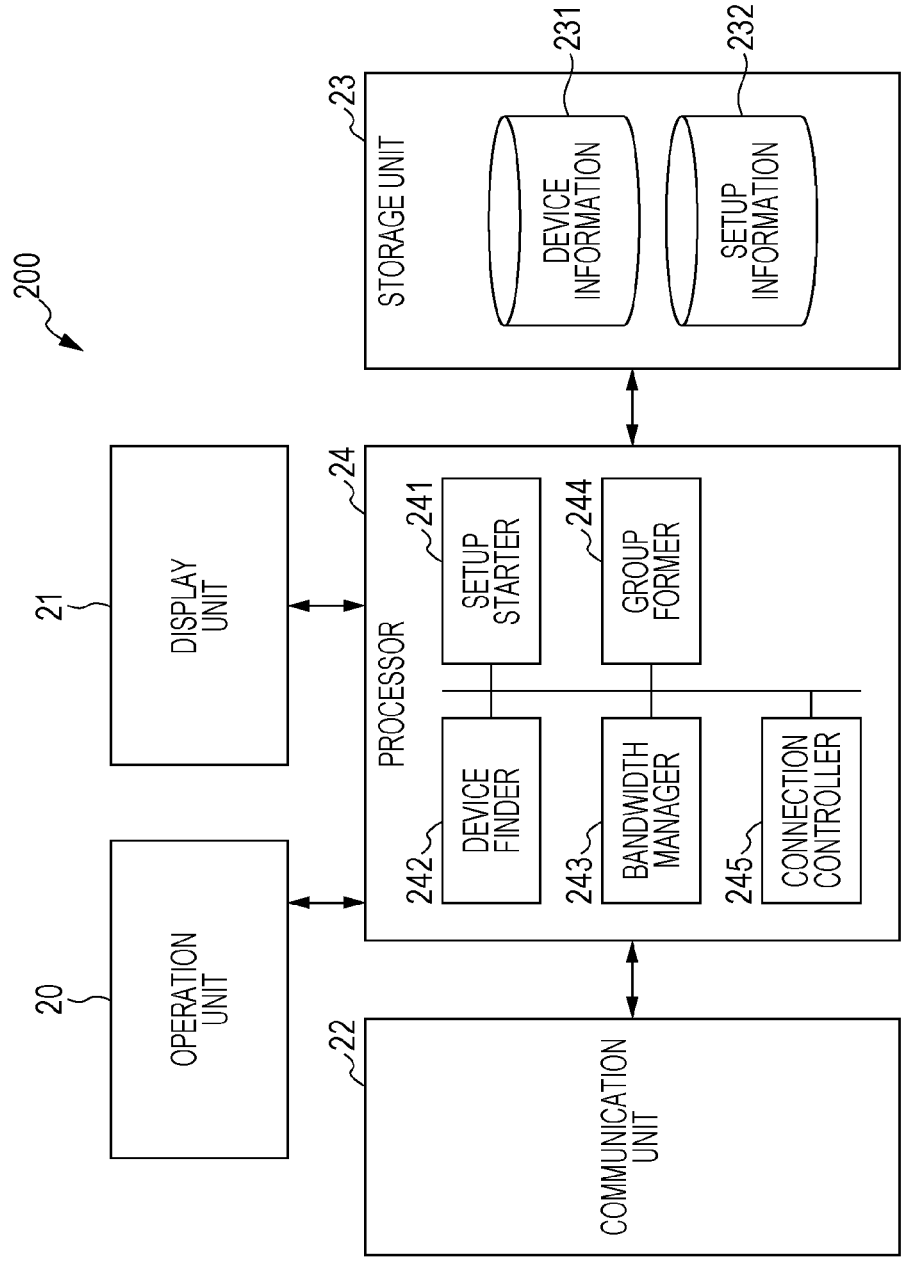
FIG. 3 is a block diagram illustrating an example of the configuration of a wireless communication device according to an embodiment.

FIG. 2 is a block diagram illustrating an example of the configuration of the wireless communication device 100. FIG. 3 is a block diagram illustrating an example of the configuration of the wireless communication device 200.

The configuration of the wireless communication device 100 is similar to that of the wireless communication device 200. Hereinafter, the wireless communication device 100 will be described below as an example, and an explanation of the wireless communication device 200 will be omitted or simplified.

The wireless communication device 100 includes an operation unit 10, a display unit 11, a communication unit 12, a storage unit 13, and a processor 14. The processor 14 includes a configuration starter 141, a device finder 142, a bandwidth manager 143, a group former 144, and a connection controller 145.

Similarly, the wireless communication device 200 includes an operation unit 20, a display unit 21, a communication unit 22, a storage unit 23, and a processor 24. The processor 24 includes a configuration starter 241, a device finder 242, a bandwidth manager 243, a group former 244, and a connection controller 245.

The operation unit 20, the display unit 21, the communication unit 22, the storage unit 23, and the processor 24 have configurations and functions similar to those of the operation unit 10, the display unit 11, the communication unit 12, the storage unit 13, and the processor 14, respectively.

The configuration starter 241, the device finder 242, the bandwidth manager 243, the group former 244, and the connection controller 245 have configurations and functions similar to those of the configuration starter 141, the device finder 142, the bandwidth manager 143, the group former 144, and the connection controller 145, respectively.

The operation unit 10 includes input devices for receiving an operation performed by a user, such as a keyboard, a mouse, hardware buttons, and a touch panel.

The display unit 11 includes a display device, for example, a liquid crystal display.

The communication unit 12 includes an interface for performing WiGig communication between the wireless communication device 100 and another wireless communication device (for example, the wireless communication device 200). The communication unit 12 also includes an interface for executing, for example, WPA (including WPA2), or data communication (for example, Internet Protocol (IP) communication) between the wireless communication device 100 and another wireless communication device. WPA2 is a standard of a wireless local area network (LAN) encryption system determined by the Wi-Fi alliance, and supports stronger encryption than WPA.

The storage unit 13 includes, for example, a non-volatile storage medium (for example, a hard disc drive (HDD), a solid state drive (SSD), or a flash memory). The storage unit 13 stores, for example, software (such as an operating system (OS), applications, and various programs) and various items of information (such as parameters) therein. Software is loaded into, for example, a work memory of the processor 14, and is processed by a central processing unit (CPU), and then, it is started and operated. Thus, the storage unit 13 stores, for example, a wireless communication program.

The storage unit 13 also stores device information 131 and setup information 132 therein. The device information 131 includes unique information for uniquely identifying the wireless communication device 100 (for example, a media access control (MAC) address, a service set identifier (SSID)) and capability information indicating the wireless communication capability of the wireless communication device 100 (capability information determined by WiGig).

The device information 131 may be created as a result of the processor 14 starting a wireless setup application and a user inputting a value for each parameter by using the operation unit 10, and may be stored in the storage unit 13. Alternatively, the device information 131 may be stored in the storage unit 13 as a result of the processor 14 installing software (such as a wireless device driver or middleware).

The setup information 132 includes, for example, information concerning an authentication key for executing WPA. The setup information 132 is created, for example, during the process of connection processing between the wireless communication device 100 and another wireless communication device, and is stored in the storage unit 13.

The processor 14 includes a power supply, a motherboard, a CPU, a recording medium storing a control program (for example, a read only memory (ROM)), and a work memory (for example, a random access memory (RAM)).

As stated above, the processor 14 includes the configuration starter 141, the device finder 142, the bandwidth manager 143, the group former 144, and the connection controller 145. The functions of the configuration starter 141, the device finder 142, the bandwidth manager 143, the group former 144, and the connection controller 145 are implemented as a result of the CPU executing the control program.

The configuration starter 141 obtains a setup start request from the operation unit 10. Upon receiving an operation for a request to start a setup with another wireless communication device from a user, the operation unit 10 generates a setup start request and outputs it to the configuration starter 141. The setup includes a setup for executing WiGig P2P by the wireless communication device 100 with another wireless communication device.

Upon obtaining a setup start request, the configuration starter 141 reads the device information 131 and the setup information 132 from the storage unit 13, and outputs them to the device finder 142.

Upon obtaining the device information 131 and the setup information 142, the device finder 132 (an example of a finding unit) starts finding another wireless communication device existing around the wireless communication device 100.

For example, the device finder 142 generates a first frame (for example, a discovery beacon or probe request) on the basis of the received device information 131 and setup information 132. The first frame includes the device information 131 and the setup information 132.

The device finder 142 sends the generated first frame to another wireless communication device via the communication unit 12. The device finder 142 also receives a first frame (for example, a discovery beacon or probe response) generated by another wireless communication device via the communication unit 12. The first frame received by the device finder 142 includes unique information for uniquely identifying this wireless communication device and capability information indicating the wireless communication capability of this wireless communication device.

The device finder 142 generates find result information on the basis of the first frame received from this wireless communication device and outputs the find result information to the display unit 11.

When, for example, at least one wireless communication device has been found, the device finder 142 generates find result information including information concerning the found wireless communication device. The information concerning the found wireless communication device includes unique information for uniquely identifying the found wireless communication device and capability information indicating the wireless communication capability of the found wireless communication device.

When, for example, no wireless communication device has been found, the device finder 142 generates find result information indicating that no wireless communication device has been found. The generated find result information is displayed on the display unit 11.

When at least one wireless communication device has been found, the device finder 142 generates device information concerning each wireless communication device that has been found, on the basis of the first frame. This device information, as well as the device information 131, includes unique information for uniquely identifying the found wireless communication device and capability information indicating the wireless communication capability of the found wireless communication device. For distinguishing device information generated concerning a found wireless communication device from the device information 131 concerning the wireless communication device 100, it will also be referred to as "communication peer device information".

For each wireless communication device that has been found, the device finder 142 may determine the roles of the wireless communication device 100 and the communication peer device (that is, which device will be a GO and which device will be a CL), on the basis of the device information 131 and the communication peer device information. The communication peer device is a wireless communication device which will communicate with the wireless communication device 100 among the found wireless communication devices, and is, for example, the wireless communication device 200.

A determination concerning the roles refers to a determination as to which of the wireless communication device 100 and the communication peer device will serve as a GO and as a CL. The roles may be determined by a method defined by WiGig. Every time the roles are determined, the device finder 142 generates information concerning the determined roles (role determination results).

The roles may not be necessarily determined by the device finder 142. For example, the group former 144 may determine the roles and generate role determination results. That is, the roles are not determined in the find phase in which devices are found, but are determined in the group formation phase in which a group is formed.

The device finder 142 also receives a communication partner notification from the operation unit 10. The operation unit 10 receives a user operation that specifies a wireless communication device (communication peer device) which will be communicated with the wireless communication device 100 among wireless communication devices indicated in the find result information, and generates communication partner notification in accordance with the content of the user operation. The communication partner notification includes information concerning the specified wireless communication device (such as unique information for uniquely identifying the specified communication peer device). Accordingly, the operation unit 10 also serves as a specifying unit that specifies a wireless communication device to be communicated.

The device finder 142 outputs, for example, communication peer device information concerning the wireless communication device specified by the communication partner notification, role determination results indicating the roles of the wireless communication device 100 and the wireless communication device specified by the communication partner notification, the device information 131, and the setup information 132, to the bandwidth manager 143.

The phase in which wireless communication devices are found by the device finder 142 may be simply referred to as a "find phase". The find phase includes a search phase (an example of a first phase) and a listen phase (an example of a second phase).

The search phase is a phase in which the wireless communication device 100 sends a first frame to a wireless communication device around the wireless communication device 100. The listen phase is a phase in which, in response to a first frame received from a wireless communication device around the wireless communication device 100, the wireless communication device 100 returns a response frame, such as a probe response.

In the find phase, the search phase and the listen phase are alternately repeated at predetermined intervals (for example, 100 ms). Instead of alternately repeating the search phase and the listen phase, one of the search phase and the listen phase may be selected and fixed. Information concerning which of the search phase or the listen phase is fixed is stored in an internal memory of the device finder 142 or in the storage unit 13.

The bandwidth manager 143 obtains the communication peer device information, role determination results, device information 131, and setup information 132 from the device finder 142. The bandwidth manager 143 also manages the bandwidth for executing, for example, WiGig P2P, in accordance with the obtained items of information.

Bandwidth management performed by the bandwidth manager 143 includes generating and sending of a second frame (for example, a temporary beacon) including bandwidth schedule information. The bandwidth is a communication bandwidth (for example, a communication frequency and rate) of a wireless network between the wireless communication device 100 and a communication peer device.

After the find phase has been completed or while the find phase is being continuing, the bandwidth manager 143 sets the communication mode to one of the following communication modes upon receiving an instruction to send an action frame or receiving an action frame. That is, the bandwidth manager 143 also serves as a communication mode setting unit. An instruction to send an action frame is based on, for example, specifying of a communication peer device.

Action frames are data for forming a group with a communication peer device, and include group owner negotiation (GO Nego) frames.

The Go Nego frames include three types of frames, such as a group owner negotiation request (GO Nego Request) frame, a group owner negotiation response (GO Nego Response) frame, and a group owner negotiation confirm (GO Nego Confirm) frame.

When the find processing (processing in the find phase) is being continuing and when the phase of the find processing is the search phase, the wireless communication device 100 is in a position to send a beacon (discovery beacon). In this case, the device finder 142 stops the find processing and the bandwidth manager 143 switches the communication mode to a first communication mode.

The first communication mode is a mode in which action frames are sent and received while maintaining the sending of a beacon, such as a group formation beacon (temporary beacon). In this case, without the device finder 142 explicitly stopping the find processing, the bandwidth manager 143 may start the first communication mode.

When the find processing is being continuing and when the phase of the find processing is the listen phase, the wireless communication device 100 is not sending a beacon, but is waiting for receiving a beacon from a wireless communication device around the wireless communication device 100. In this case, the device finder 142 stops the find processing and the bandwidth manager 143 switches the communication mode to a second communication mode.

The second communication mode is a mode in which action frames are sent and received while maintaining the state in which a beacon, such as a group formation beacon (temporary beacon), is being received. In this case, without the device finder 142 explicitly stopping the find processing, the bandwidth manager 143 may start the second communication mode. The bandwidth manager 143 may also restrict a beacon to be received from a wireless communication device, on the basis of the communication peer device information.

When the bandwidth manager 143 has switched the communication mode to the second communication mode, when a communication peer device is in the listen phase, both of the wireless communication device 100 and the communication peer device are waiting for receiving a beacon. In this case, the communication peer device may be switched to the search phase. Then, when the communication peer device sends a beacon and the wireless communication device 100 receives the beacon, group formation processing (for example, processing for sending and receiving action frames) can be started. In this manner, the wireless communication device 100 may transfer the role in sending a beacon to a communication peer device.

Conversely, when the bandwidth manager 143 has switched the communication mode to the first communication mode, when a communication peer device is in the search phase, both of the wireless communication device 100 and the communication peer device are in a position to send a beacon. Accordingly, based on the WiGig standard or the IEEE802.11ad standard, priority may be given to a beacon which is received first or to a wireless communication device having a MAC address with a greater number. That is, based on a certain priority, a beacon sent by one of the wireless communication device 100 and the communication peer device is prioritized. In this case, the bandwidth manager 143 may switch the communication mode to the second communication mode.

In this manner, when the bandwidth manager 143 shifts the communication mode to the first communication mode, it operates as a temporary GO and starts to perform bandwidth management. For example, the bandwidth manager 143 starts the first communication mode and generates a beacon to be sent in the first communication mode. The bandwidth manager 143 then sends the generated beacon to the communication peer device via the communication unit 12. When the bandwidth manager 143 shifts the communication mode to the second communication mode, it operates as a temporary CL and starts to receive a beacon via the communication unit 12.

After switching the communication mode to the first or second communication mode, the bandwidth manager 143 outputs the communication peer device information, role determination results, device information 131, and setup information 132 to the group former 144.

The bandwidth manager 143 may refer to the communication peer device information and may determine whether or not it will be necessary to perform bandwidth management in accordance with the communication frequency used by the communication peer device. Information indicating the association between the communication frequency and the need to perform bandwidth management (bandwidth management determination information) is stored in the setup information referred to by the bandwidth manager 143 or within the bandwidth manager 143. The bandwidth manager 143 refers to the bandwidth management determination information and determines whether or not it is necessary to perform bandwidth management in accordance with the communication frequency.

In the bandwidth management determination information, the association between the communication frequency and the need to perform bandwidth management may be defined as follows. When the communication frequency is 2.4 GHz, bandwidth management is not necessary. When the communication frequency is 5 GHz, bandwidth management is not necessary. When the communication frequency is 60 GHz, bandwidth management is necessary.

By storing or referring to such bandwidth management determination information, when the communication frequency used by a communication peer device is 2.4 or 5 GHz, the bandwidth manager 143 may send and receive action frames without performing bandwidth management, that is, without sending a second frame. On the other hand, when the communication frequency used by a communication peer device is 60 GHz, the bandwidth manager 143 may perform the above-described bandwidth management, that is, it may send a second frame. With this arrangement, bandwidth management is performed when it is necessary, thereby improving the quality of connection processing. In contrast, bandwidth management is not performed when it is not necessary, thereby simplifying connection processing.

The bandwidth management determination information may be included in, for example, a beacon frame or a probe frame, and the bandwidth manager 143 may use such bandwidth management determination information.

The group former 144 obtains a group formation start instruction from the operation unit 10. The group formation start instruction is information indicating an instruction to start forming a group between the wireless communication device 100 and a communication peer device. The operation unit 10 receives an operation for starting to form a group from a user and generates information indicating a group formation start instruction.

When a group formation start instruction is not received from the operation unit 10, the group former 144 may start forming a group after the bandwidth manager 143 has switched the communication mode to the first or second communication mode.

Upon obtaining a group formation start instruction from the operation unit 10, the group former 144 starts group formation processing on the basis of the communication peer device information, device information 131, and setup information 132 obtained from the bandwidth manager 143. Group formation processing includes sending and receiving of action frames.

Group formation processing is started as a result of the wireless communication device 100 sending a group owner negotiation request frame to the communication peer device. Accordingly, the group former 144 first sends a group owner negotiation request frame via the communication unit 12.

A description will now be given of the configuration of the wireless communication device 200 regarding the settings of communication modes, that is, components of the wireless communication device 200 that have not been discussed above. Although a description will be given of the configuration of the wireless communication device 200, the configuration of the wireless communication device 100 is similar to that of the wireless communication device 200.

When the device finder 242 is continuing find processing and when the phase of the find processing is the listen phase, the wireless communication device 200 is not sending a beacon, but is waiting for receiving a beacon from a wireless communication device (for example, the wireless communication device 100) around the wireless communication device 200. In this state, upon receiving a group owner negotiation request frame, the device finder 242 stops the find processing and the bandwidth manager 243 switches the communication mode to a third communication mode.

The third communication mode is a mode in which action frames are sent and received while maintaining the state in which a beacon is being received. In this case, without the device finder 242 explicitly stopping the find processing, the bandwidth manager 243 may start the third communication mode. The bandwidth manager 243 may also restrict a beacon to be received from a wireless communication device, on the basis of the communication peer device information.

When the device finder 242 is continuing find processing and when the phase of the find processing is the search phase, the wireless communication device 200 is in a position to send a beacon. In this case, upon receiving a group owner negotiation request frame, the device finder 242 stops the find processing and the bandwidth manager 243 switches the communication mode to a fourth communication mode.

The fourth communication mode is a mode in which action frames are sent and received while maintaining the sending of a beacon. In this case, without the device finder 242 explicitly stopping the find processing, the bandwidth manager 243 may start the fourth communication mode.

The configuration of the wireless communication device 100 will be described again.

The group former 144 repeatedly sends a GO Nego Request frame and waits for receiving a GO Nego Response frame until the state of the wireless communication device 200 is switched from the find processing to the third or fourth communication mode.

The group former 144 also exchanges information concerning the formation of a group and information for executing WPS (hereinafter referred to as "WPS information") with the communication peer device. The information concerning the formation of a group includes Group Owner Intent, which is information for determining the roles, and information concerning a channel used for performing data communication after the formation of a group. There are multiple protocols for WPS. Accordingly, in this case, the WPS information includes information indicating methods that are executable by the wireless communication device 100 and the wireless communication device 200. Examples of executable methods based on the WPS protocols are button pushing as a trigger and inputting of a personal identification number (PIN). The role decision method is defined by the standards, and thus, a detailed explanation will be omitted.

Upon completion of sending and receiving of GO Nego frames, the group former 144 may stop sending a beacon, thereby enhancing the efficiency of a wireless network. Even after sending and receiving of GO Nego action frames has been completed, when sending and receiving of action frames other than GO Nego frames is required, the group former 144 may continue sending a beacon.

The group former 144 also decides the roles of the wireless communication device 100 and the communication peer device on the basis of the role determination results obtained from the bandwidth manager 143. For example, when the wireless communication device 100 serves as a temporary GO, the group former 144 sets the role of the wireless communication device 100 to be a GO, or changes its role to a CL if necessary. After deciding the roles, a wireless communication device that is set to be a GO sends a beacon.

Instead of obtaining the role determination results from the bandwidth manager 143, the group former 144 may determine the roles after sending and receiving GO Nego frames. In this case, the group former 144 may create role determination results on the basis of the determination of roles, and then decide the roles.

The group former 144 executes WPS on the basis of WPS information received from the communication peer device, and shares an authentication key with the communication peer device.

Upon completion of WPS, the group former 144 generates a group formation completion notification indicating the completion of WPS and outputs it to the display unit 11. Then, the display unit 11 displays information that group formation has been completed. In this manner, group formation processing is terminated.

The group former 144 outputs the device information 131, setup information 132, and communication partner information to the connection controller 145.

The connection controller 145 obtains a connection request from the operation unit 10. A connection request is information indicating a request to connect to a communication peer device and is generated by the operation unit 10 when the operation unit 10 receives an operation for a request to connect to a communication peer device from a user.

Upon obtaining a connection request from the operation unit 10, the connection controller 145 executes WPA on the basis of the device information 131, setup information 132, and communication peer device information obtained from the group former 144, so as to conduct authentication. With this operation, encryption communication can be performed in WiGig P2P.

Upon completion of WPA, the connection controller 145 generates a connection completion notification indicating the completion of WPA and outputs it to the display unit 11. Then, the display unit 11 displays information that connection with the communication peer device has been completed. In this manner, the wireless communication device 100 and the communication peer device can perform data communication by using WiGig P2P.

An example of the operation of the communication system 1000 will be described below.

Figure 4:
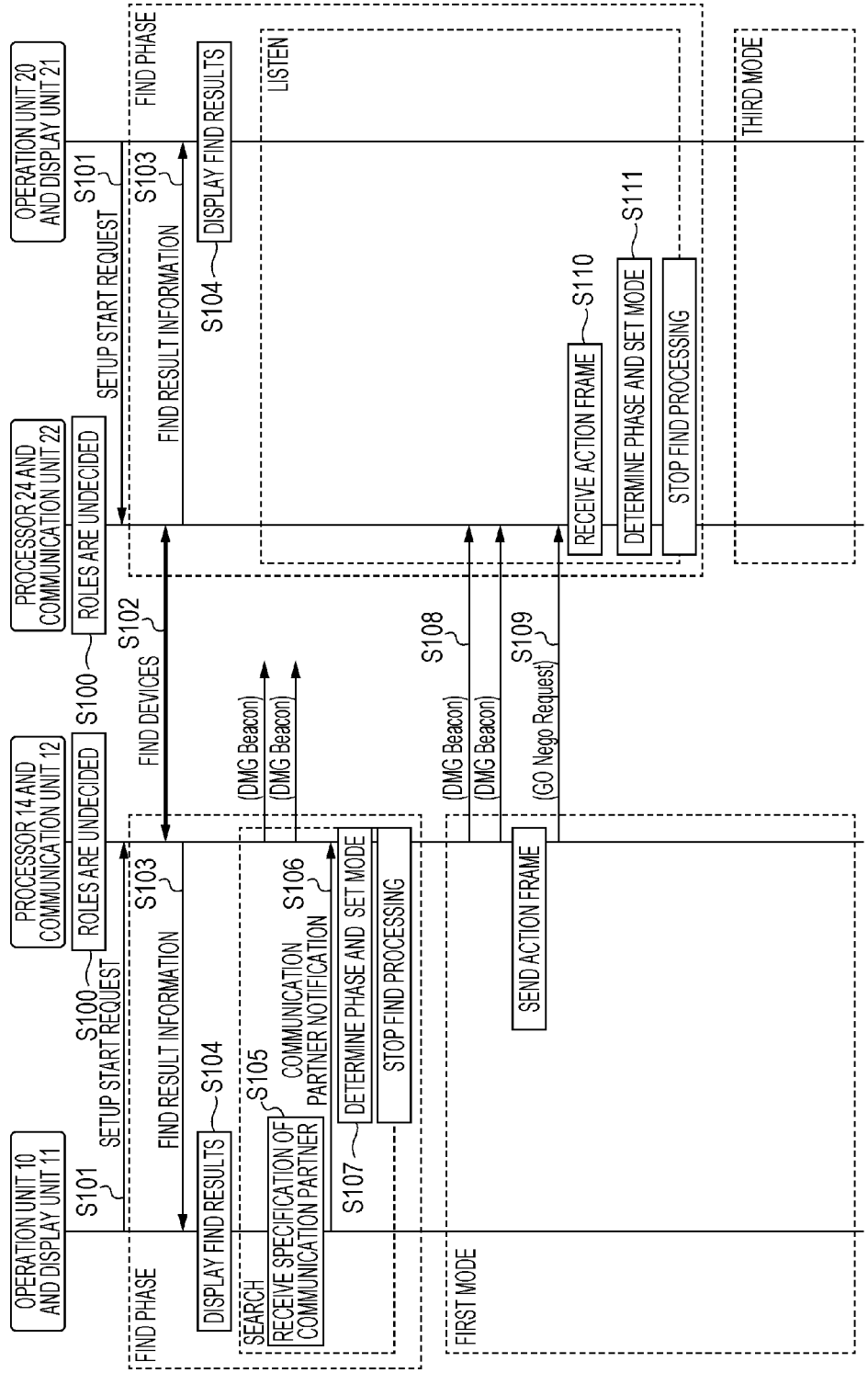
FIGS. 4 and 5 are time charts illustrating a first example of connection processing between wireless communication devices according to an embodiment.
Figure 5:
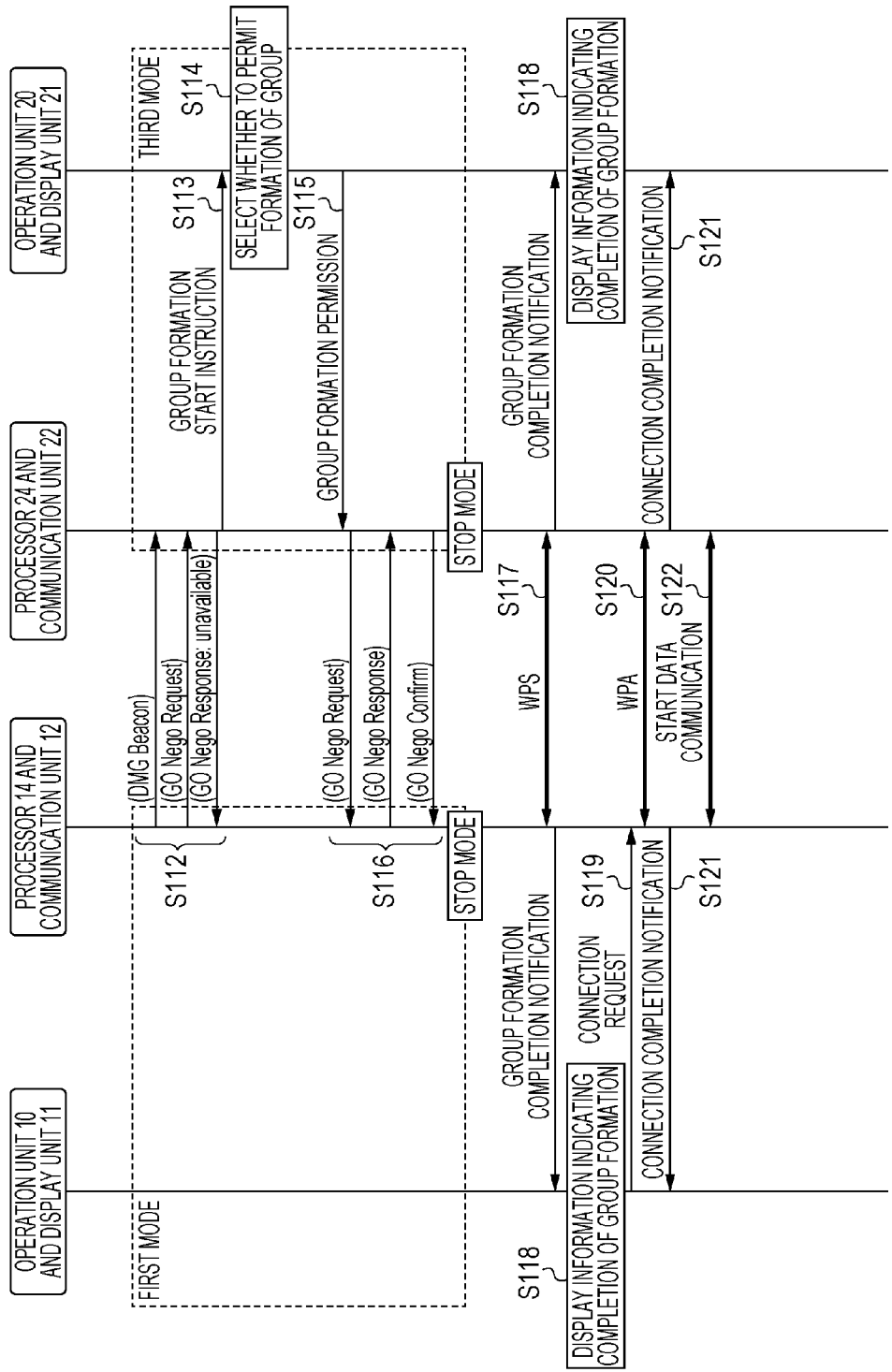

FIGS. 4 and 5 are time charts illustrating a first example of connection processing between the wireless communication devices 100 and 200. It is assumed in FIGS. 4 and 5 that the wireless communication device 200 is a communication peer device for the wireless communication device 100. Connection processing is processing for establishing a communication channel used for performing data communication between the wireless communication devices 100 and 200. It is assumed in FIGS. 4 and 5 that the wireless communication device 100 is in the search phase during the find phase processing at a time when a communication peer device is specified among wireless communication devices that have been successfully found.

The connection processing shown in FIGS. 4 and 5 is executed, for example, when two users perform data communication between their respective wireless communication devices 100 and 200 by using WiGig P2P or between a household television and a smartphone by using WiGig P2P. Data includes video data and still image data.

In step S100, before executing connection processing, the roles are still undecided for the wireless communication devices 100 and 200. That is, the wireless communication devices 100 and 200 are neither a GO nor a CL and are stations (STAs) for which roles are undecided.

In step S101, upon receiving a user operation, the operation unit 10 generates a setup start request and sends it to the processor 14. Similarly, upon receiving a user operation, the operation unit 20 generates a setup start request and sends it to the processor 24.

More specifically, in step S101, the users first cause the wireless communication devices 100 and 200 to face each other so that they can wirelessly communicate with each other. Then, by using the operation units 10 and 20, the users start an application for performing WiGig communication in the wireless communication devices 100 and 200. Then, by using the operation units 10 and 20, the users select a menu for starting a WiGig communication device and software from a setup screen of the started application in the wireless communication devices 100 and 200.

With this operation, the wireless communication devices 100 and 200 are instructed to set settings for the connection using WiGig P2P, and the operation units 10 and 20 generate the above-described setup start request. The application may be started in one of the wireless communication devices 100 and 200.

Upon obtaining a setup start request from the operation unit 10, the configuration starter 141 of the processor 14 reads the device information 131 and the setup information 132 from the storage unit 13, and outputs them to the device finder 142. Similarly, upon obtaining a setup start request from the operation unit 20, the configuration starter 241 of the processor 24 reads the device information 231 and the setup information 232 from the storage unit 23, and outputs them to the device finder 242.

Then, in step S102, upon obtaining the device information 131 and the setup information 132, the device finder 142 starts to find wireless communication devices around the wireless communication device 100. Similarly, in step S102, upon obtaining the device information 231 and the setup information 232, the device finder 242 starts to find wireless communication devices around the wireless communication device 200.

More specifically, in step S102, the device finder 142 first generates a first frame on the basis of the device information 131 and the setup information 132. Similarly, the device finder 242 first generates a first frame on the basis of the device information 231 and the setup information 232. In FIG. 4, as an example of the first frame, a discovery beacon (Directional Multi-Gigabit (DMG) Beacon) is shown. Then, the device finders 142 and 242 send the generated discovery beacons (first frames) to the other wireless communication devices via the communication units 12 and 22, respectively. The device finders 142 and 242 receive the first frames generated by the other wireless communication devices via the communication units 12 and 22, respectively. A discovery beacon is repeatedly sent at predetermined intervals (for example, 100 ms).

In FIG. 4, the device finder 142 receives a first frame from the wireless communication device 200 via the communication unit 12, and the device finder 242 receives a first frame from the wireless communication device 100 via the communication unit 22.

In this example, it is assumed that, as a result of executing find processing, the device finder 142 has successfully found at least the wireless communication device 200 and the device finder 242 has successfully found at least the wireless communication device 100.

Then, in step S103, the device finder 142 generates find result information on the basis of the first frame received from another wireless communication device and outputs the find result information to the display unit 11. Similarly, in step S103, the device finder 242 generates find result information on the basis of the first frame received from another wireless communication device and outputs the find result information to the display unit 21.

In this example, the find result information generated by the device finder 142 includes at least identification information indicating the wireless communication device 200, and the find result information generated by the device finder 242 includes at least identification information indicating the wireless communication device 100.

In step S103, the device finder 142 also generates communication peer device information on the basis of the first frame received from another wireless communication device. Similarly, in step S103, the device finder 242 also generates communication peer device information on the basis of the first frame received from another wireless communication device. The communication peer device information is generated for each of the wireless communication devices that have been successfully found.

In this example, the communication peer device information generated by the device finder 142 includes at least identification information indicating the wireless communication device 200, and the communication peer device information generated by the device finder 242 includes at least identification information indicating the wireless communication device 100.

In step S103, the device finder 142 may determine roles of the wireless communication device 100 and a communication peer device on the basis of the device information 131 and the communication peer device information, and may generate role determination results. Similarly, in step S103, the device finder 242 may determine roles of the wireless communication device 200 and a communication peer device on the basis of the device information 231 and the communication peer device information, and may generate role determination results. The determination of roles is performed for each of the wireless communication devices that have been successfully found. The role determination results are generated every time roles are determined.

In FIG. 4, it is assumed that the role determination results generated by the device finder 142 indicate that the wireless communication device 100 is a GO and that the role determination results generated by the device finder 242 indicate that the wireless communication device 200 is a CL.

Roles may be determined, not in the find phase, but in the group formation phase.

In step S104, the display units 11 and 21 display respective find results including the find result information. For example, the display units 11 and 21 indicate other wireless communication devices that have been successfully found. That is, the display unit 11 displays at least identification information concerning the wireless communication device 200, and the display unit 21 displays at least identification information concerning the wireless communication device 100.

When the find result information includes a plurality of items of information concerning a plurality of wireless communication devices that have been successfully found, the display units 11 and 21 may display a list of the plurality of items of information concerning the successfully found wireless communication devices.

Then, in step S105, the operation unit 10 receives an operation for specifying the wireless communication device 200 as a communication peer device from the user. An example in which the operation unit 10 of the wireless communication device 100 receives an operation for specifying the wireless communication device 200 is shown. Alliteratively, the operation unit 20 of the wireless communication device 200 may receive an operation for specifying the wireless communication device 100.

Then, in step S106, the operation unit 10 generates a communication partner notification indicating that the wireless communication device 200 has been specified, and outputs the communication partner notification to the processor 14.

The device finder 142 of the processor 14 then extracts, on the basis of the communication partner notification, the communication peer device information concerning the wireless communication device 200 and the role determination results indicating the roles of the wireless communication devices 200 and 100. The communication peer device information concerning the wireless communication device 200 is similar to the device information 231 of the wireless communication device 200. The device finder 142 outputs the communication peer device information, the role determination results, and the device information 131 and the setup information 132 stored in the storage unit 13 to the bandwidth manager 143.

Then, in step S107, the bandwidth manager 143 obtains the communication peer device information, role determination results, device information 131, and setup information 132 from the device finder 142. The bandwidth manager 143 refers to the storage unit 13 and determines whether the wireless communication device 100 is in the search phase or in the listen phase during the find processing. That is, the bandwidth manager 143 also serves as a phase determining unit. The bandwidth manager 143 sets the communication mode to a predetermined communication mode according to whether the wireless communication device 100 is in the search phase or in the listen phase.

In FIG. 4, since the wireless communication device 100 is in the search phase at a time in step S107, the device finder 142 stops the find processing and the bandwidth manager 143 switches the communication mode to the above-described first communication mode. In this case, without the device finder 142 explicitly stopping the find processing, the bandwidth manager 143 may start the first communication mode.

When the bandwidth manager 143 has switched the communication mode to the first communication mode, when a wireless communication device 200 is in the search phase, both of the wireless communication devices 100 and 200 are in a position to send a beacon. Accordingly, based on the WiGig standard or the IEEE802.11ad standard, priority may be given to a beacon which is received first or to a wireless communication device having a MAC address with a greater number. That is, based on a certain priority, a beacon sent by one of the wireless communication devices 100 and 200 is prioritized. In this case, the bandwidth manager 143 may switch the communication mode to the second communication mode.

In step S108, after the wireless communication device 100 is set to be the first communication mode, the bandwidth manager 143 generates a beacon (temporary beacon) and starts to send it to the wireless communication device 200 via the communication unit 12. This makes it possible to send an action frame from the wireless communication device 100 to the wireless communication device 200. A temporary beacon (indicated by DMG Beacon in FIG. 4) is an example of the second frame.

As an action frame, a GO Nego frame may be specified, or another frame (for example, a Provision Discovery frame) may be specified. An action frame may be specified in the find phase via the operation unit 10. In FIG. 4, a GO Nego frame is sent.

After the communication mode is switched to the first communication mode, the bandwidth manager 143 outputs the communication peer device information, role determination results, device information 131, and setup information 132 to the group former 144.

The processing stage in steps S101 through S104 may be referred to as the "find phase", or the processing stage in steps S101 through S108 may be referred to as the "find phase". That is, without explicitly stopping the find phase, sending and receiving of action frames may be performed.

Upon completion of step S108, the processor 14 generates a group formation start instruction to start to form a group between the wireless communication devices 200 and 100, and outputs the group formation start instruction to the group former 144. Alliteratively, the operation unit 10 may generate a group formation start instruction as a result of receiving a user operation.

Upon receiving a group formation start instruction from the processor 14, the group former 144 starts group formation processing. Group formation processing is performed on the basis of the communication peer device information, device information 131, and setup information 132 obtained from the bandwidth manager 143.

Then, in step S109, the group former 144 sends a GO Nego Request frame to the wireless communication device 200 via the communication unit 12. The group former 144 waits for receiving a GO Nego Response frame in response to a Go Nego Request frame, and repeatedly sends a GO Nego Request frame.

Meanwhile, in step S110, the wireless communication device 200 receives a GO Nego Request frame via the communication unit 22. At this time, the wireless communication device 200 is executing find processing by using the device finder 242. Then, in step S111, the bandwidth manager 243 refers to the storage unit 23 and determines whether the wireless communication device 200 is in the search phase or in the listen phase during the find phase processing. Then, the device finder 242 and the bandwidth manager 243 set the communication mode to a predetermined communication mode according to whether the wireless communication device 200 is in the search phase or in the listen phase.

Since the wireless communication device 200 is in the listen phase at a time of step S110, the bandwidth manager 243 switches the communication mode to the above-described third communication mode. In this case, without the device finder 242 explicitly stopping the find processing, the bandwidth manager 243 may start the third communication mode. The bandwidth manager 243 may also restrict a beacon to be received from a wireless communication device, on the basis of the communication peer device information.

Then, in step S112, after the wireless communication device 200 has been switched to the third communication mode, upon receiving a GO Nego Request frame from the wireless communication device 100, the wireless communication device 200 responds to this GO Nego Request frame via the communication unit 22. In this case, the wireless communication device 200 returns a GO Nego Response frame as a response to the wireless communication device 100 via the communication unit 22. At a time of step S112, preparations for starting to form a group have not finished, and thus, the wireless communication device 200 sends a notification that the formation of a group is not permitted (GO Nego Response: unavailable).

In step S113, upon receiving a GO Nego Request frame, the configuration starter 241 of the processor 24 generates a group formation start instruction and outputs it to the display unit 21. The group formation start instruction includes information indicating that the wireless communication device 200 starts to form a group with the wireless communication device 100.

In step S114, upon receiving the group formation start instruction, the display unit 21 displays information which causes a user to determine whether to permit the formation of a group with the wireless communication device 100.

In step S115, upon receiving an operation indicating whether or not the user has selected to permit the formation of a group, the operation unit 20 generates information indicating the selection result (group formation selection result) and outputs it to the processor 24.

It is assumed that, in step S115, the operation unit 20 has received an operation indicating that the user has selected to permit the formation of a group with the wireless communication device 100. Accordingly, the group formation selection result indicates that the formation of a group with the wireless communication device 100 has been permitted.

Then, in step S116, the group former 244 of the processor 24 sends a GO Nego Confirm frame including the group formation selection result received from the operation unit 20 to the wireless communication device 100 via the communication unit 22. The GO Nego Confirm frame may include information concerning the formation of a group and WPS information.

Upon completion of sending and receiving of GO Nego frames between the wireless communication devices 100 and 200, the group former 144 or the bandwidth manager 143 stops sending beacons. The completion of sending and receiving of Go Nego frames can be acknowledged by, for example, receiving a Go Nego Confirm frame.

Even after the sending and receiving of GO Nego frames has been completed, when sending and receiving of action frames other than GO Nego action frames are required, the group former 144 or the bandwidth manager 143 may continue sending beacons.

The operations performed by the wireless communication devices 100 and 200 regarding the group formation processing are not restricted to those in steps S109 through 116.

Subsequently, the group former 144 decides the role of the wireless communication device 100 on the basis of the role determination results obtained from the bandwidth manager 143. The group former 244 obtains the role determination results from the device finder 242 or the bandwidth manager 243, and decides the role of the wireless communication device 200 on the basis of the role determination results.

When, instead of obtaining the role determination results from the bandwidth manager 143, the group former 144 creates role determination results after sending and receiving the above-described three types of GO Nego frames, it decides roles on the basis of the created role determination results.

The wireless communication device 100 operated as a temporary GO is set to be the role (for example, a GO) indicated by the role determination results. The wireless communication device 200 is set to be the role (for example, a CL) indicated by the role determination results. If necessary, the role of the wireless communication device 100 is changed to a CL, and the role of the wireless communication device 200 is changed to a GO. When the roles are reversed, the wireless communication device 200 starts sending a beacon. The roles which have been set as described above are roles which will serve in the execution of WPS (step S117) and subsequent steps.

In step S117, the group formers 144 and 244 execute WPS on the basis of WPS information so as to share an authentication key. Since WPS is known, an explanation thereof will be omitted.

In step S118, upon completion of WPS, the group former 144 generates a group formation completion notification indicating the completion of WPS and outputs it to the display unit 11. Similarly, in step S118, upon completion of WPS, the group former 244 generates a group formation completion notification indicating the completion of WPS and outputs it to the display unit 21. With this operation, the display units 11 and 21 display information that the formation of a group has been completed. In this manner, group formation processing is terminated.

Then, the group former 144 outputs the device information 131, setup information 132, and communication peer device information to the connection controller 145. Similarly, the group former 244 outputs the device information 131, setup information 132, and communication peer device information to the connection controller 245.

Processing in steps S109 through S118 is also referred to as the "group formation procedure".

Then, in step S119, upon receiving an operation for a request to connect to the wireless communication device 200 from the user, the operation unit 10 generates a connection request and outputs it to the processor 14. In this example, the operation unit 10 of the wireless communication device 100 receives an operation for a request to connect to the wireless communication device 200. Alternatively, the operation unit 20 of the wireless communication device 200 may receive an operation for a request to connect to the wireless communication device 100.

In step S120, upon receiving a connection request from the operation unit 10, the connection controller 145 of the processor 14 executes WPA with the wireless communication device 200 on the basis of the device information 131, setup information 132, and communication peer device information obtained from the group former 144 so as to perform authentication. Since WPA is known, an explanation thereof will be omitted. With this operation, encryption communication can be performed.

Then, upon completion of WPA, in step S121, the connection controller 145 generates a connection completion notification indicating that WPA has been completed, and outputs it to the display unit 11. Similarly, upon completion of WPA, in step S121, the connection controller 245 generates a connection completion notification indicating that WPA has been completed, and outputs it to the display unit 21. Then, the display units 11 and 21 display information that the connection with a communication peer device has been completed. In this manner, in step S122, the wireless communication devices 100 and 200 can perform data communication by using WiGig P2P.

Processing in steps S119 through S121 is also referred to as the "operational phase".

In the first example of the operation performed by the wireless communication system 1000, even in the state in which the wireless communication devices 100 and 200 have not finished find processing, it is possible to send a second frame upon receiving an instruction to send an action frame or receiving an action frame. The find processing may continue or may be stopped. Accordingly, bandwidth management in WiGig P2P can be performed, and also, an action frame can be sent. It is thus possible to execute the formation of a group, WPS, and WPA so that a communication channel between the wireless communication devices 100 and 200 can be correctly established, thereby enabling the wireless communication devices 100 and 200 to directly communicate with each other by using WiGig P2P.

Since the wireless communication device 100 sets a communication mode in accordance with the specifying of a communication peer device in the search phase, it is able to send a temporary beacon without requiring a special user operation. Meanwhile, the wireless communication device 200 sets a communication mode in accordance with the reception of an action frame in the listen phase, it is able to receive a temporary beacon without requiring a special user operation.

Figure 6:
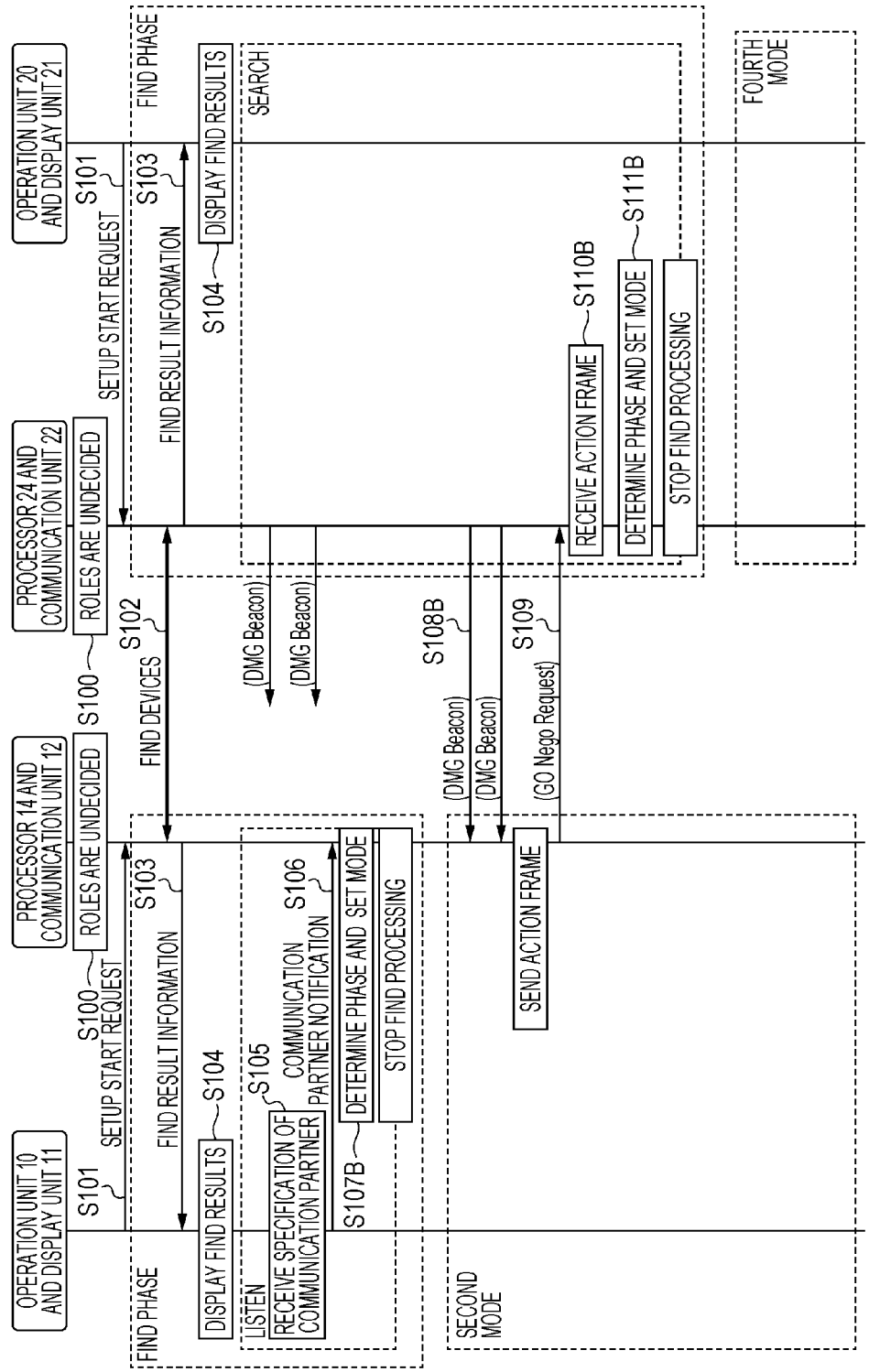
FIGS. 6 and 7 are time charts illustrating a second example of connection processing between wireless communication devices according to an embodiment.
Figure 7:
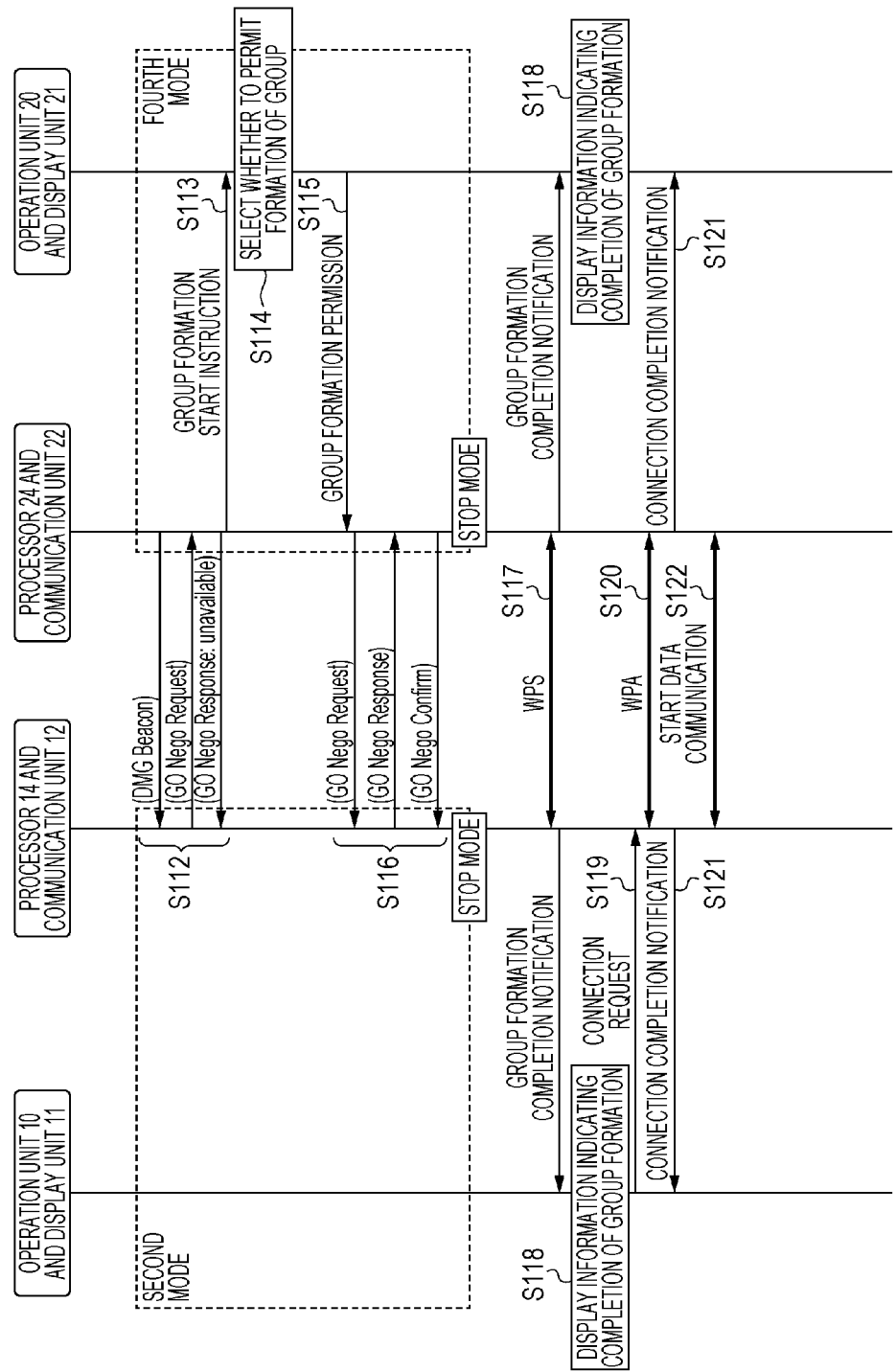

FIGS. 6 and 7 are time charts illustrating a second example of connection processing between the wireless communication devices 100 and 200. It is assumed in FIGS. 6 and 7 that the wireless communication device 200 is a communication peer device for the wireless communication device 100. It is assumed in FIGS. 6 and 7 that the wireless communication device 100 is in the listen phase during the find phase processing at a time when a communication peer device is specified among wireless communication devices that have been successfully found.

In FIGS. 6 and 7, operations similar to those of FIGS. 4 and 5 are designated by like step numbers, and an explanation thereof will thus be omitted or simplified.

In FIG. 6, the wireless communication device 100 is in the listen phase during find phase processing, while the wireless communication device 200 is in the search phase during find phase processing. In this case, the role determination results generated by the device finder 142 indicate that the wireless communication device 100 is a CL, and the role determination results generated by the device finder 242 indicate that the wireless communication device 200 is a GO. That is, the role of the wireless communication device 100 is specified as a temporary CL, while the role of the wireless communication device 200 is specified as a temporary GO.

In FIG. 6, since, at a time in step S107B, the wireless communication device 100 is in the listen phase, the device finder 142 stops the find processing and the bandwidth manager 143 switches the communication mode to the above-described second communication mode. In this case, without the device finder 142 explicitly stopping the find processing, the bandwidth manager 143 may start the second communication mode. The bandwidth manager 143 may also restrict a beacon to be received from a wireless communication device, on the basis of the communication peer device information.

When the bandwidth manager 143 has switched the communication mode to the second communication mode, when the wireless communication device 200 as a communication peer device is in the listen phase, both of the wireless communication devices 100 and 200 are waiting for receiving a beacon. In this case, the wireless communication device 200 may be switched to the search phase. Then, when the wireless communication device 200 sends a beacon and the wireless communication device 100 receives the beacon, group formation processing (for example, processing for sending and receiving action frames) can be started.

In step S108B, the device finder 242 of the wireless communication device 200 in the search phase sends a discovery beacon (DMG Beacon) as a first frame. The discovery beacon is repeatedly sent at predetermined intervals (for example, 100 ms).

In FIG. 6, as well as in FIG. 4, specifying of a communication peer device is received by the operation unit 10 of the wireless communication device 100. Accordingly, in step S109, the group former 144 sends a GO Nego Request frame to the wireless communication device 200 via the communication unit 12.

When the device finder 242 is continuing find processing and when the phase of the find processing is the search phase, the wireless communication device 200 is in a position to send a beacon. In this case, in step S110B, the device finder 242 receives a group owner negotiation request frame. Then, in step S111B, the device finder 242 stops the find processing and the bandwidth manager 243 switches the communication mode to the fourth communication mode. In this case, without the device finder 242 explicitly stopping the find processing, the bandwidth manager 243 may start the fourth communication mode.

While the communication modes of both of the wireless communication devices 100 and 200 are being switched, the wireless communication device 100 is repeatedly sending a GO Nego Request frame and is waiting for receiving a GO Nego Response frame.

In step S112, in the wireless communication device 200 which has been switched to the fourth communication mode, the bandwidth manager 243 generates a beacon including bandwidth schedule information and sends it to the wireless communication device 100 via the communication unit 22.

In FIGS. 6 and 7, steps S112 and the subsequent steps are similar to those of FIGS. 4 and 5, except for the sender of a beacon (wireless communication device 200), and thus, an explanation thereof will be omitted.

In the second example of the operation performed by the wireless communication system 1000, even in the state in which the wireless communication devices 100 and 200 have not finished find processing, it is possible to send a second frame upon receiving an instruction to send an action frame or receiving an action frame. The find processing may continue or may be stopped. Accordingly, bandwidth management in WiGig P2P can be performed, and also, an action frame can be sent. It is thus possible to execute the formation of a group, WPS, and WPA so that a communication channel between the wireless communication devices 100 and 200 can be correctly established, thereby enabling the wireless communication devices 100 and 200 to directly communicate with each other by using WiGig P2P.

Since the wireless communication device 100 sets a communication mode in accordance with the specifying of a communication peer device in the listen phase, it is able to receive a temporary beacon and to send and receive action frames without requiring a special user operation. Meanwhile, the wireless communication device 200 sets a communication mode in accordance with the reception of an action frame in the search phase, it is able to send a temporary beacon and to send and receive action frames without requiring a special user operation.

Examples of the configurations of a beacon will be described below.

In FIGS. 4 and 5, the wireless communication device 100 sends a beacon, while, in FIGS. 6, and 7, the wireless communication device 200 sends a beacon. There are, for example, two types of beacons: a discovery beacon and a group formation beacon (temporary beacon). The configurations of a discovery beacon are similar to those of the other beacons, except that a discovery flag is set. Beacons are constructed in the form of, for example, a frame format.

A beacon includes schedule information for conducting bandwidth management. The configurations of a temporary beacon will be discussed below with reference to FIGS. 8A through 9B. Examples of the configurations shown in FIGS. 8A through 9B conform to the WiGig standard.

FIG. 8A schematically illustrates an example of the frame format of a beacon. In FIG. 8A, schedule information is added to Body.

FIG. 8B schematically illustrates examples of parameters included in Body shown in FIG. 8A. Among the parameters shown in FIG. 8B, the schedule information is included in, for example, DMG Parameters and Extended Schedule.

FIG. 8C schematically illustrates an example of the format of DMG Parameters. In "CBAP Only" shown in FIG. 8C, a parameter indicating whether or not the bandwidth (Beacon Interval) is constituted only by CBAP (Contention-Based Access Periods) is described. CBAP is a best-effort bandwidth in which any wireless communication devices can perform communication.

When the bandwidth is constituted only by CBAP, CBAP Only is set to be "true". In contrast, when the bandwidth includes SP (special period) as well as CBAP, CBAP Only is set to be "false". When CBAP Only is set to be "false", Extended Schedule is added so as to specify detailed schedules.

FIG. 8D schematically illustrates an example of the format of Extended Schedule. When CBAP Only shown in FIG. 8C is set to be "false", the details of the bandwidth (Beacon Interval) are indicated by a plurality of ESEs (Extended Schedule Elements) representing a string of data elements (Allocations) shown in FIG. 8D. That is, the format shown in FIG. 8D indicates which types of blocks are arranged in which manner within the bandwidth (beacon interval). In FIG. 8D, the same number of elements "Allocation" as the number of types of blocks are added.

FIG. 8E schematically illustrates an example of the format of each Allocation element. The meanings of the individual fields shown in FIG. 8E are as follows. Allocation Control includes information for distinguishing CBAP from SP. BF Control includes information indicating whether or not radio waves have been subjected to beamforming. Source AID and Destination AID include information indicating which wireless communication device forms a link with which wireless communication device. Allocation Start includes information indicating the block start timing (μs).

Allocation Block Duration includes information indicating the width of one block. Number of Blocks includes information indicating the number of blocks included in one beacon interval. Allocation Block Period includes information indicating the width (time) between blocks.

FIG. 8F illustrates the format of Beacon Interval Control shown in FIG. 8B. Discovery Mode is a field indicating a discovery beacon, and it is set to be "true" when a beacon is sent before forming a network. Accordingly, when a temporary beacon is sent, Discovery Mode is also set to be "true". Thus, the format of a discovery beacon may also be used for a temporary beacon.

For distinguishing a temporary beacon from other beacons, a temporary beacon flag explicitly indicating that a beacon is a temporary beacon may be provided. The temporary beacon flag is defined in a field "Reserved" in the WiGig standard. For example, in B44 through B47 of the Reserved field in FIG. 8F, B44 may be used as an area in which the temporary beacon flag is indicated. Alternatively, the DMG Parameters field shown in FIG. 8C may be extended, and one bit of the reserved field at the tail of the DMG Parameters may be allocated to the temporary beacon flag. Alternatively, the value 0 assigned to the reserved field of the BSS Type field (two bits) at the head of the DMG Parameters field may be allocated to the temporary beacon flag.

FIGS. 9A and 9B schematically illustrate an example of the configuration of Beacon Interval. FIG. 9A illustrates an example of the configuration of Beacon Interval when CBAP Only shown in FIG. 8C is set to be true. In this case, DTI (Data Transfer Interval) of Beacon Interval is constituted only by CBAP. FIG. 9B illustrates an example of the configuration of Beacon Interval when CBAP Only shown in FIG. 8C is set to be false. In this case, DTI of Beacon Interval is constituted by CBAP and SP.

By sending a beacon constructed as the formats shown in FIGS. 8A through 9B, each wireless communication device can identify how CBAP and/or SP are allocated in a bandwidth (beacon interval). Accordingly, in the wireless communication system 1000, it is possible to send action frames in the state in which the bandwidth is managed.

When performing WiGig P2P, the wireless communication devices 100 and 200 are operated as follows.

It is assumed that, in the find phase, a user has specified a communication partner via the operation unit 10 or 20 or that an action frame has been received via the communication unit 12 or 22. In this case, the bandwidth managers 143 and 243 respectively determine whether the bandwidth management (for example, sending of a beacon) is being continuing or the state in which a beacon is received is continuing according to whether the wireless communication devices 100 and 200 are in the search phase or in the listen phase. According to the determination results, the bandwidth managers 143 and 243 switch the communication mode to the first communication mode in which action frames are sent and received by sending a temporary beacon or the second communication mode in which action frames are sent and received by receiving a temporary beacon, and continue these switched modes until the execution of WPS is started.

With this operation, even before find processing has been completed, the wireless communication devices 100 and 200 are able to send and receive action frames (such as GO Nego frames for starting the formation of a group) to and from the wireless communication devices 200 and 100. Accordingly, the wireless communication devices 100 and 200 are able to proceed with the formation of a group, WPS, and WPA, thereby making it possible to perform data communication.

For example, when the wireless communication devices 100 and 200 are cellular phones or smartphones, there is a possibility that find processing be not explicitly completed. Even in this case, by sending a second frame for conducting bandwidth management, action frames can be sent and received. Thus, the communication channel between the wireless communication devices 100 and 200 can be established with high quality, thereby making it possible to improve the communication quality.

Modified Examples of this embodiment will be described below.

(First Modified Example)

The determination of roles in find processing performed in the above-described embodiment is not essential. For example, one of the wireless communication devices 100 and 200 for which roles are undecided may generate and send a temporary beacon. The wireless communication devices 100 and 200 may generate and send a temporary beacon while remaining as STAs instead of serving as a temporary GO. In the above-described embodiment, the role determination results generated in find processing indicate that the wireless communication device 100 is a GO and the wireless communication device 200 is a CL. However, the roles may be reversed.

(Second Modified Example)

In the above-described embodiment, bandwidth management is performed by using a temporary beacon. Alternatively, bandwidth management may be performed by using an announce frame. FIG. 10A schematically illustrates an example of the format of an announce frame. In FIG. 10A, schedule information is added to Frame Body. FIG. 10B schematically illustrates an example of parameters included in Frame Body shown in FIG. 10A. In Last (vendor-specific area) shown in FIG. 10B, Extended Schedule is described. That is, bandwidth schedule information is described in Extended Schedule, as shown in FIG. 10C.

By sending an announce frame configured as shown in FIGS. 10A through 10C, bandwidth management can be conducted in a manner similar to that by using a temporary beacon.

(Third Modified Example)

In the above-described embodiment, as examples of action frames, Go Nego Request, Go Nego Response, and Go Nego Confirm frames are used. However, action frames are not restricted to these frames.

For example, action frames may be Provision Discovery Request and Provision Discovery Response frames used for exchanging WPS information.

Alliteratively, action frames may be Service Discovery Request and Service Discovery Response frames used for exchanging service information.

Alliteratively, action frames may be Group Discoverability Request and Group Discoverability Response frames used for a query to a CL belonging to a predetermined group.

Alternatively, action frames may be P2P Invitation Request and P2P Invitation Response frames used for an invitation to a predetermined group.

(Fourth Modified Example)

In the above-described embodiment, the wireless communication devices 100 and 200 are constituted by hardware. However, the wireless communication devices 100 and 200 may be implemented by software in cooperation with hardware.

Figure 11A:
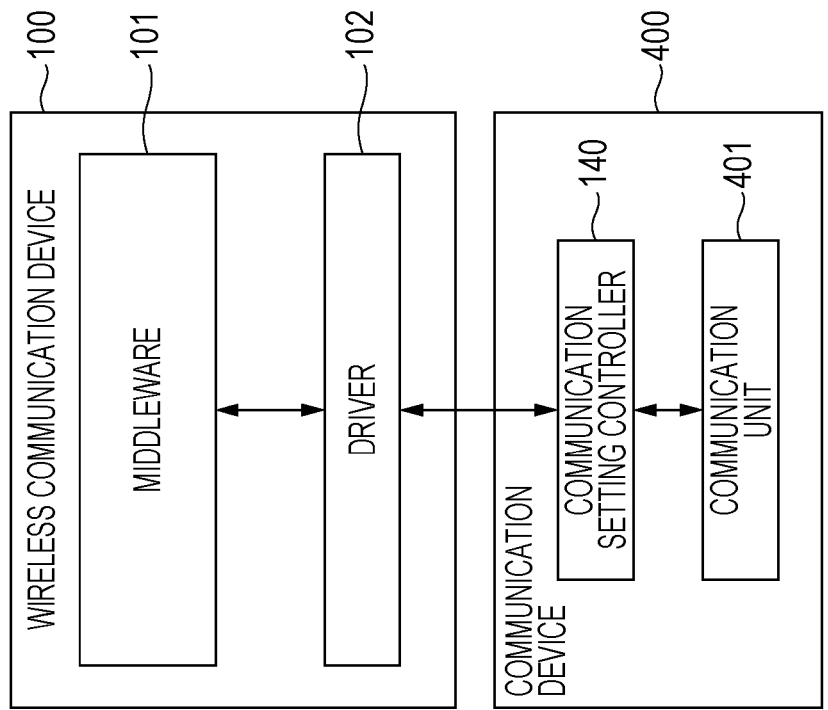
FIGS. 11A and 11B are block diagrams illustrating examples of the software configuration of a wireless communication device according to an embodiment.
Figure 11B:
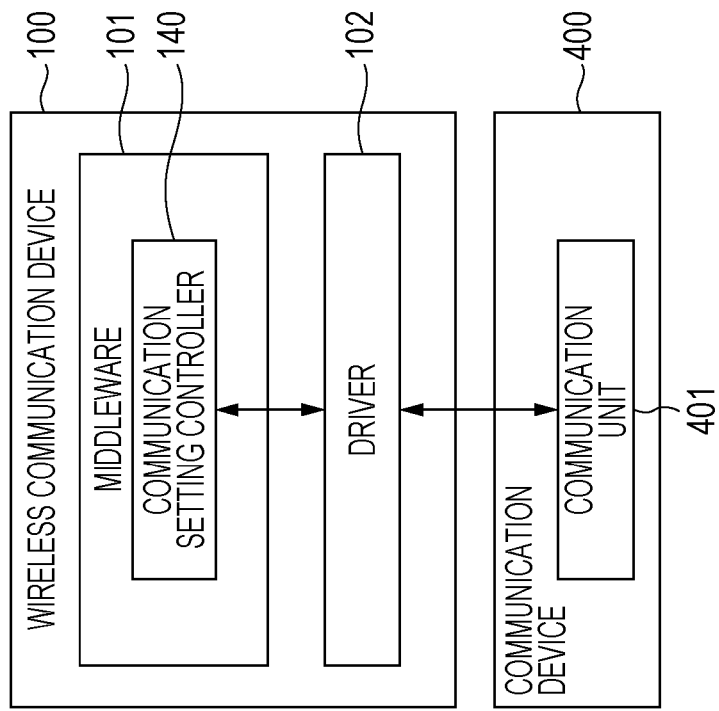

FIGS. 11A and 11B are block diagrams illustrating examples of the software configuration of the wireless communication device 100. In FIGS. 11A and 11B, although the wireless communication device 100 is shown, the wireless communication device 200 may also be configured in a similar manner.

In a first example shown in FIG. 11A, the wireless communication device 100 is connectable to a communication device 400 so as to perform WiGig communication. The wireless communication device 100 includes middleware 101 and a driver 102. The middleware 101 includes a communication setting controller 140.

The communication setting controller 140 includes the individual elements of the processor 14 shown in FIG. 1. That is, in FIG. 11A, the individual elements of the processor 14 are implemented as the middleware 101. The communication setting controller 140 controls a communication unit 401 of the communication device 400 via the driver 102 so as to perform WiGig communication.

The middleware 101 may be an application. The communication setting controller 140 may be disposed in the driver 102.

In a second example shown in FIG. 11B, the wireless communication device 100 is connectable to a communication device 400 so as to perform WiGig communication. Unlike in FIG. 11A, in FIG. 11B, the communication setting controller 140 is disposed in the communication device 400. The communication setting controller 140 receives a request from the middleware 101 via the driver 102 and controls the communication unit 401 so as to perform WiGig communication. The middleware 101 may be an application.

The present disclosure is not restricted to the configurations of the above-described embodiment. Any configuration is applicable to the present disclosure as long as such a configuration implements functions of the configurations of the above-described embodiment.

In the above-described embodiment, an example in which the present disclosure is constituted by hardware has been discussed. However, the present disclosure may be implemented by software in cooperation with hardware.

The functional blocks utilized for describing the above-described embodiment are implemented typically by a large scale integrated circuit (LSI), which is one example of integrated circuits. These functional blocks may be formed into individual chips, or some or all of the functional blocks may be formed into one chip. Such an LSI may be called an IC, a system LSI, a super LSI, or an ultra LSI, depending on the integration degree.

The integration technology of the functional blocks is not restricted to an LSI technology. Instead, a dedicated circuit or a general-purpose processor may be used. For example, a field programmable gate array (FPGA) that is programmable after it is manufactured, or a reconfigurable processor that may reconfigure connections or settings of circuit cells within this processor may be used.

Further, due to the progress of semiconductor technologies or the appearance of a derivative technology, when a circuit integration technology which replaces an LSI technology is developed, the functional blocks may be integrated by utilizing such a technology. The application of a biotechnology, for example, may be one of such cases.

(Overview of Aspects of the Present Disclosure)

According to a first aspect of the present disclosure, there is provided a wireless communication device including: a communication unit that performs communication; a finding unit that finds another wireless communication device via the communication unit by using a first frame; a phase determining unit that determines whether the wireless communication device is in a first phase in which the first frame is sent or in a second phase in which the first frame is received when information concerning the other communication device that is found is obtained; a communication mode setting unit that sets a communication mode for sending or receiving a second frame and an action frame in accordance with a result determined by the phase determining unit, the second frame including schedule information concerning a bandwidth used for communication with the other wireless communication device, the action frame being used for forming a group with the other wireless communication device; and a group forming unit that sends or receives the second frame and the action frame via the communication unit in accordance with a communication mode set by the communication mode setting unit.

According to a second aspect of the present disclosure, in the wireless communication device according to the first aspect, the group forming unit may send or receive the second frame and the action frame via the communication unit in accordance with the communication mode set so as to form the group. The communication unit may directly communicate with the other wireless communication device when the group is formed by the group forming unit.

According to a third aspect of the present disclosure, in the wireless communication device according to the first or second aspect, the group forming unit may stop sending the second frame after sending or receiving of the action frame has been completed.

According to a fourth aspect of the present disclosure, the wireless communication device according to one of the first through third aspects may further include a specifying unit that specifies the other wireless communication device. The communication mode setting unit may set the communication mode when the other wireless communication device is specified by the specifying unit.

According to a fifth aspect of the present disclosure, in the wireless communication device according to one of the first through third aspects, the communication mode setting unit may set the communication mode when the action frame is received by the communication unit.

According to a sixth aspect of the present disclosure, in the wireless communication device according to the fourth aspect, when the other wireless communication device is specified by the specifying unit and it is determined by the phase determining unit that the wireless communication device is in the first phase, the communication mode setting unit may set the communication mode to a first communication mode for sending the second frame and for sending or receiving the action frame.

According to a seventh aspect of the present disclosure, in the wireless communication device according to the fourth aspect, when the other wireless communication device is specified by the specifying unit and it is determined by the phase determining unit that the wireless communication device is in the second phase, the communication mode setting unit may set the communication mode to a second communication mode for receiving the second frame and for sending or receiving the action frame.

According to an eighth aspect of the present disclosure, in the wireless communication device according to the fifth aspect, when an action frame is received by the communication unit and it is determined by the phase determining unit that the wireless communication device is in the first phase, the communication mode setting unit may set the communication mode to a third communication mode for sending the second frame and for sending or receiving the action frame.

According to a ninth aspect of the present disclosure, in the wireless communication device according to the fifth aspect, when an action frame is received by the communication unit and it is determined by the phase determining unit that the wireless communication device is in the second phase, the communication mode setting unit may set the communication mode to a fourth communication mode for receiving the second frame and for sending or receiving the action frame.

According to a tenth aspect of the present disclosure, in the wireless communication device according to one of the first through ninth aspects, the group forming unit may determine whether or not it is necessary to perform bandwidth management in accordance with a frequency used for communication with the other wireless communication device, and when it is determined that the bandwidth management is necessary, the group forming unit may send the second frame.

According to an eleventh aspect of the present disclosure, in the wireless communication device according to one of the first through tenth aspects, the communication unit may perform the communication according to a WiGig system.

According to a twelfth aspect of the present disclosure, there is provided a wireless communication method for a wireless communication device. The wireless communication method includes: finding another wireless communication device by using a first frame; determining whether the finding is in a first phase in which the first frame is sent or in a second phase in which the first frame is received when information concerning the other wireless communication device that is found is obtained; setting, in accordance with a result from the determining, a communication mode for sending or receiving a second frame and an action frame, the second frame including schedule information concerning a bandwidth used for communication with the other wireless communication device, the action frame being used for forming a group with the other wireless communication device; and sending or receiving the second frame and the action frame in accordance with the set communication mode.

According to a thirteenth aspect of the present disclosure, there is provided a non-transitory computer-readable recording medium storing a program for a wireless communication device, the program causing a computer to execute: finding another wireless communication device by using a first frame; determining whether the finding is in a first phase in which the first frame is sent or in a second phase in which the first frame is received when information concerning the other wireless communication device that is found is obtained; setting, in accordance with a result from the determining, a communication mode for sending or receiving a second frame and an action frame, the second frame including schedule information concerning a bandwidth used for communication with the other wireless communication device, the action frame being used for forming a group with the other wireless communication device; and sending or receiving the second frame and the action frame in accordance with the communication mode that is set.

The present disclosure is suitably used for, for example, a wireless communication device, a wireless communication method, and a non-transitory computer-readable recording medium storing a program that implement an improvement in the communication quality when wireless communication devices directly communicate with each other by using a predetermined communication system.

What is claimed is:

1. A wireless communication device comprising:
   communication circuitry that, in operation, performs communication;
   finding circuitry that, in operation, finds another wireless communication device via the communication circuitry by using a first frame;
   phase determining circuitry that, in operation, determines whether the wireless communication device is in a first phase in which the first frame is sent or in a second phase in which the first frame is received when information concerning the other wireless communication device that is found is obtained;
   communication mode setting circuitry that, in operation, sets a communication mode for sending or receiving a second frame and an action frame in accordance with a result determined by the phase determining circuitry, the second frame including schedule information concerning a time in a beacon interval used for communication with the other wireless communication device, the action frame being used for forming a group with the other wireless communication device; and
   group forming circuitry that, in operation, sends or receives the second frame and the action frame via the communication circuitry in accordance with the communication mode set by the communication mode setting circuitry.

2. The wireless communication device according to claim 1, wherein:
   the group forming circuitry, in operation, sends or receives the second frame and the action frame via the communication circuitry in accordance with the communication mode so as to form the group; and
   the communication circuitry, in operation, directly communicates with the other wireless communication device when the group is formed by the group forming circuitry.

3. The wireless communication device according to claim 1, wherein the group forming circuitry, in operation, stops sending the second frame after sending or receiving of the action frame has been completed.

4. The wireless communication device according to claim 1, further comprising:
   specifying circuitry that, in operation, specifies the other wireless communication device,
   wherein the communication mode setting circuitry, in operation, sets the communication mode when the other wireless communication device is specified by the specifying circuitry.

5. The wireless communication device according to claim 4, wherein, when the other wireless communication device is specified by the specifying circuitry and it is determined by the phase determining circuitry that the wireless communication device is in the first phase, the communication mode setting circuitry, in operation, sets the communication mode to a first communication mode for sending the second frame and for sending or receiving the action frame.

6. The wireless communication device according to claim 4, wherein, when the other wireless communication device is specified by the specifying circuitry and it is determined by the phase determining circuitry that the wireless communication device is in the second phase, the communication mode setting circuitry, in operation, sets the communication mode to a second communication mode for receiving the second frame and for sending or receiving the action frame.

7. The wireless communication device according to claim 1, wherein the communication mode setting circuitry, in operation, sets the communication mode when the action frame is received by the communication circuitry.

8. The wireless communication device according to claim 7, wherein, when the action frame is received by the communication circuitry and it is determined by the phase determining circuitry that the wireless communication device is in the first phase, the communication mode setting circuitry, in operation, sets the communication mode to a third communication mode for sending the second frame and for sending or receiving the action frame.

9. The wireless communication device according to claim 7, wherein, when the action frame is received by the communication circuitry and it is determined by the phase determining circuitry that the wireless communication device is in the second phase, the communication mode setting circuitry, in operation, sets the communication mode to a fourth communication mode for receiving the second frame and for sending or receiving the action frame.

10. The wireless communication device according to claim 1, wherein the group forming circuitry, in operation, determines whether or not it is necessary to perform bandwidth management in accordance with a frequency used for communication with the other wireless communication device, and when it is determined that the bandwidth management is necessary, the group forming circuitry sends the second frame.

11. The wireless communication device according to claim 1, wherein the communication circuitry performs the communication according to a WiGig system.

12. A wireless communication method for a wireless communication device, the method comprising:
   finding another wireless communication device by using a first frame;
   determining whether the finding is in a first phase in which the first frame is sent or in a second phase in which the first frame is received when information concerning the other wireless communication device that is found is obtained;
   setting, in accordance with a result from the determining, a communication mode for sending or receiving a second frame and an action frame, the second frame including schedule information concerning a time in a beacon interval used for communication with the other wireless communication device, the action frame being used for forming a group with the other wireless communication device; and
   sending or receiving the second frame and the action frame in accordance with the communication mode that is set.

13. The wireless communication method according to claim 12, further comprising:
   determining whether to perform bandwidth management for communication with the other wireless communication device based on a frequency used for communication with the other wireless communication device; and
   sending the second frame when it is determined to perform bandwidth management.

14. A non-transitory computer-recordable medium storing a program for a wireless communication device, the program causing a computer to execute:
   finding another wireless communication device by using a first frame;
   determining whether the finding is in a first phase in which the first frame is sent or in a second phase in which the first frame is received when information concerning the other wireless communication device that is found is obtained;
   setting, in accordance with a result from the determining, a communication mode for sending or receiving a second frame and an action frame, the second frame including schedule information concerning a time in a beacon interval used for communication with the other wireless communication device, the action frame being used for forming a group with the other wireless communication device; and
   sending or receiving the second frame and the action frame in accordance with the communication mode that is set.

15. The non-transitory computer-recordable medium according to claim 14, wherein the program further causes the computer to execute:
   determining whether to perform bandwidth management for communication with the other wireless communication device based on a frequency used for communication with the other wireless communication device; and
   sending the second frame when it is determined to perform bandwidth management.

16. The non-transitory computer-recordable medium according to claim 14, further comprising:
   maintaining the sending of the second frame being sent while the action frame is being sent or received; and
   stopping the sending of the second frame after the sending or receiving of the action frame is completed.

* * * * *